United States Patent
Nagakura et al.

(10) Patent No.: US 11,728,676 B2
(45) Date of Patent: Aug. 15, 2023

(54) POWER CONVERSION DEVICE, CONTROL DEVICE, SERVER AND SYSTEM

(71) Applicant: FUJI ELECTRIC CO., LTD., Kanagawa (JP)

(72) Inventors: Takayuki Nagakura, Yokohama (JP); Songhao Yin, Hino (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 418 days.

(21) Appl. No.: 16/910,098

(22) Filed: Jun. 24, 2020

(65) Prior Publication Data
US 2021/0006091 A1 Jan. 7, 2021

(30) Foreign Application Priority Data
Jul. 4, 2019 (JP) .................... 2019-125540

(51) Int. Cl.
H02J 13/00 (2006.01)
H02J 3/00 (2006.01)
G05B 13/02 (2006.01)

(52) U.S. Cl.
CPC ...... *H02J 13/00022* (2020.01); *G05B 13/021* (2013.01); *H02J 3/001* (2020.01); *H02J 13/00002* (2020.01)

(58) Field of Classification Search
CPC ............... H02J 13/00022; H02J 3/001; H02J 13/00002; H02J 3/16; H02J 3/241;
(Continued)

(56) References Cited

U.S. PATENT DOCUMENTS

| 6,285,917 B1* | 9/2001 | Sekiguchi | H02J 3/0073 340/3.7 |
| 2005/0213272 A1* | 9/2005 | Kobayashi | H02J 3/381 361/62 |

(Continued)

FOREIGN PATENT DOCUMENTS

| DE | 102011013609 A1 | 9/2012 |
| JP | H0819183 A | 1/1996 |

(Continued)

OTHER PUBLICATIONS

Office Action issued for counterpart German Application 102020207682.0, issued by the German Patent and Trade Mark Office dated Mar. 2, 2022.

*Primary Examiner* — Ziaul Karim

(57) ABSTRACT

A power conversion device which converts electrical power generated by a distributed energy resource into electrical power corresponding to a power system is provided, comprising a communication unit which periodically receives, via communication, reception information indicating whether an accident has occurred in the power system, a disconnection unit which disconnects the distributed energy resource from the power system when the communication unit receives the reception information indicating accident occurrence, and a control unit which starts an islanding determination process for determining whether the distributed energy resource is in an islanding state by detecting a change in AC characteristics in the power system, when the communication unit does not receive the reception information for a predetermined first period.

17 Claims, 16 Drawing Sheets

(58) Field of Classification Search
CPC .... H02J 3/388; H02J 13/00004; H02J 3/0012; H02J 3/381; H02J 13/0003; H02J 2300/22; G05B 13/021; Y02B 90/20; Y02E 10/50; Y02E 40/30; Y02E 60/00; Y02E 40/70; Y04S 10/22; Y04S 40/126; H02S 50/00

See application file for complete search history.

(56) References Cited

U.S. PATENT DOCUMENTS

| | | | |
|---|---|---|---|
| 2008/0100145 A1 | 5/2008 | Ito | |
| 2009/0206059 A1* | 8/2009 | Kiko | H02J 13/00017 218/143 |
| 2013/0060243 A1* | 3/2013 | Kuhn | A61N 7/00 606/27 |
| 2013/0155734 A1* | 6/2013 | El-Barbari | H02J 3/381 363/55 |
| 2014/0001863 A1* | 1/2014 | Zhang | H02J 9/062 307/66 |
| 2017/0086276 A1* | 3/2017 | Ramer | H04W 4/80 |
| 2018/0152238 A1* | 5/2018 | Gerszberg | H02J 13/00024 |
| 2019/0027960 A1* | 1/2019 | Agrawal | H02J 9/062 |
| 2019/0199099 A1 | 6/2019 | Nagakura | |
| 2019/0389314 A1* | 12/2019 | Zhu | B60L 53/62 |

FOREIGN PATENT DOCUMENTS

| | | |
|---|---|---|
| JP | 2005198446 A | 7/2005 |
| JP | 2008118733 A | 5/2008 |
| JP | 2016082808 A | 5/2016 |
| JP | 2017051063 A | 3/2017 |
| JP | 2018152953 A | 9/2018 |
| JP | 2019054619 A | 4/2019 |

* cited by examiner

POWER CONVERSION DEVICE, CONTROL DEVICE, SERVER AND SYSTEM

BACKGROUND

1. Technical Field

The present invention relates to a power conversion device, a control device, a server and a system.

2. Related Art

A distributed energy resource (DER) such as a photovoltaic device are connected to a power system via a power conversion device referred to as a PCS (Power Conditioning System). The power conversion device converts electrical power output from the distributed energy resource into electrical power corresponding to the power system. When an accident occurs in the power system, the power conversion device prevents the distributed energy resource from being in an islanding state. The islanding state means a state in which a distributed energy resource continues generating power while separated from a system power supply such as a substation.

An islanding detection process (islanding determination process) to detect whether a distributed energy resource is in an islanding state includes a passive mode and an active mode. In the passive mode, it is determined whether the distributed energy resource is in an islanding state by detecting a change in AC characteristics resulting from the distributed energy resource being separated from the linkage with the power system and transitioning into an islanding state. In the active mode, the process determines whether the distributed energy resource is in an islanding state by detecting a change in AC characteristics when reactive power is injected into the power system (See, for example, Patent documents 1, 2). A distributed energy resource determined to be in an islanding state is disconnected from (released from parallel connection with) the power system. Conventionally, an islanding detection process is performed by devices on the distributed energy resource side, that is, the respective distributed energy resources themselves or power conversion devices associated with the distributed energy resources. Note that, although it is not directly related to islanding detection, a technology referred to as a transfer interruption method to disconnect a distributed energy resource from a power system is known (See, for example, Patent documents 3, 4, 5).

RELATED ART LITERATURE

Patent Documents

[Patent document 1] Japanese Unexamined Patent Application Publication No. 2017-051063
[Patent document 2] Japanese Unexamined Patent Application Publication No. 2018-152953
[Patent document 3] Japanese Unexamined Patent Application Publication No. 2005-198446
[Patent document 4] Japanese Unexamined Patent Application Publication No. H8-19183
[Patent document 5] Japanese Unexamined Patent Application Publication No. 2008-118733

GENERAL DISCLOSURE

When an islanding detection is performed on the distributed energy resource side, false detection can occur since a device on the distributed energy resource side needs to separately detect an islanding state. Therefore, it is desirable to reduce the possibility of false detection to further enhance the reliability of the islanding detection.

In a first aspect of the present invention, a power conversion device is provided. The power conversion device may convert electrical power generated by a distributed energy resource into electrical power corresponding to a power system. The power conversion device may include a communication unit, a disconnection unit, and a control unit. The communication unit may periodically receive, via communication, reception information indicating whether an accident has occurred in the power system. The disconnection unit may disconnect the distributed energy resource from the power system when the communication unit receives the reception information indicating accident occurrence. The control unit may start an islanding determination process to determine whether the distributed energy resource is in an islanding state by detecting a change in AC characteristics in the power system, when the communication unit does not receive the reception information for a predetermined first period.

The islanding determination process may determine whether the distributed energy resource is in an islanding state by detecting a change in AC characteristics in the power system when reactive power is injected into the power system.

The disconnection unit may disconnect the distributed energy resource from the power system also when the distributed energy resource is determined to be in an islanding state by the islanding determination process.

The control unit may start the islanding determination process also when the communication unit receives an instruction to start the islanding determination process.

The communication unit may be communicatively connected to a server via a communication line. The communication unit may receive the reception information from the server.

When no accident occurred in the power system, the reception information may include a transmission request for transmitting, to the server, data on a power output value of the distributed energy resource, or completion notice of reception of data on a power output value.

When the communication unit does not receive the reception information from the server for a predetermined second period, the communication unit may receive the reception information from at least one other device that is different from the server.

The other device may be an aggregator device which is communicatively connected to the server and the power conversion device, and which manages demands and supply of electrical power. The power conversion device may further include an instruction transmission unit. The instruction transmission unit may transmit, to the aggregator device, an instruction to acquire the reception information from the server and to transmit the reception information, when the communication unit does not receive the reception information from the server for the predetermined second period.

The other device may be a plurality of accident detection units installed at a plurality of predetermined locations in the power system. The respective accident detection units may be mutually communicatively connected to the power conversion device via a communication line. The power conversion device may include an instruction transmission unit. The instruction transmission unit may transmit, to a plurality of the accident detection units, an instruction to transmit the reception information, when the communication unit does not receive the reception information from the server for the predetermined second period.

The communication unit may be communicatively connected to a plurality of accident detection units installed at a plurality of predetermined locations in the power system via a communication line. The communication unit may receive the reception information from each of the plurality of accident detection units.

In a second aspect of the present invention, a control device is provided. The control device may control a power conversion device. The power conversion device may convert electrical power generated by a distributed energy resource into electrical power corresponding to a power system. The control device may include a communication unit, a disconnection unit, and a control unit. The communication unit may periodically receive, via communication, reception information indicating whether an accident has occurred in the power system. The disconnection unit may disconnect the distributed energy resource from the power system when reception information indicating accident occurrence is received by the communication unit. The control unit may start an islanding determination process to determine whether the distributed energy resource is in an islanding state by detecting a change in AC characteristics in the power system, when the communication unit does not receive the reception information for a predetermined first period.

In a third aspect of the present invention, a server is provided. The server may be capable of mutually communicating with a plurality of power conversion devices which converts electrical power generated by the respective distributed energy resources into electrical power corresponding to a power system. The server may include an acquisition unit and an information transmission unit. The acquisition unit may acquire, via a communication line, information on whether an accident has occurred in the power system from a plurality of accident detection units. The plurality of accident detection units may be installed at a plurality of predetermined locations in the power system. The information transmission unit may periodically transmit transmission information indicating no occurrence of accidents when no accident occurred in the power system. When it is determined that an accident has occurred in the power system based on the acquired information, the information transmission unit may transmits transmission information indicating accident occurrence to a power conversion device corresponding to one or more distributed energy resources associated with the location where the accident occurred in the power system, to disconnect the one or more distributed energy resources from the power system.

Information on whether an accident has occurred in the power system from each accident detection unit may include location information of where the accident has occurred.

The server may further include a start instruction transmission unit. When the acquisition unit cannot acquire the information on whether an accident has occurred from one or more accident detection units, among a plurality of accident detection units, for a predetermined period, the start instruction transmission unit may transmit, to the one or more power conversion devices associated with an installed location of the one or more accident detection units in the power system, an instruction to start an islanding determination process. The islanding determination process may determine whether a distributed energy resource is in an islanding state by detecting a change in AC characteristics in the power system.

The server may further include a parameter value transmission unit. The parameter value transmission unit may transmit, to the plurality of power conversion devices, parameter values for adjusting reactive power output characteristics. The reactive power output characteristics may be used by the distributed energy resource to perform the islanding determination process.

The server may further include a calculation unit. The calculation unit may calculate parameter values for adjusting reactive power output characteristics, based on current value at a predetermined node in the power system, and the locations of the node and each power conversion device.

When no accident occurred in the power system, the transmission information may include a transmission request for transmitting, to the server, data on the power output value of the distributed energy resource, or a completion notice of reception of data on the power output value.

When no accident occurred in the power system, the transmission information may include information in which values are incremented sequentially.

In a fourth aspect of the present invention, a system is provided. The system may include a power conversion device and a server. The transmission information from the server may be received at the communication unit of the power conversion device as the reception information.

The summary clause does not necessarily describe all necessary features of the embodiments of the present invention. The present invention may also be a sub-combination of the features described above.

DESCRIPTION OF EXEMPLARY EMBODIMENTS

Hereinbelow, the present invention will be described through embodiments of the invention, but the following embodiments do not limit the invention disclosed in the claims. In addition, not all combinations of features described in the embodiments are necessarily essential to the solution of the invention.

Figure 1:
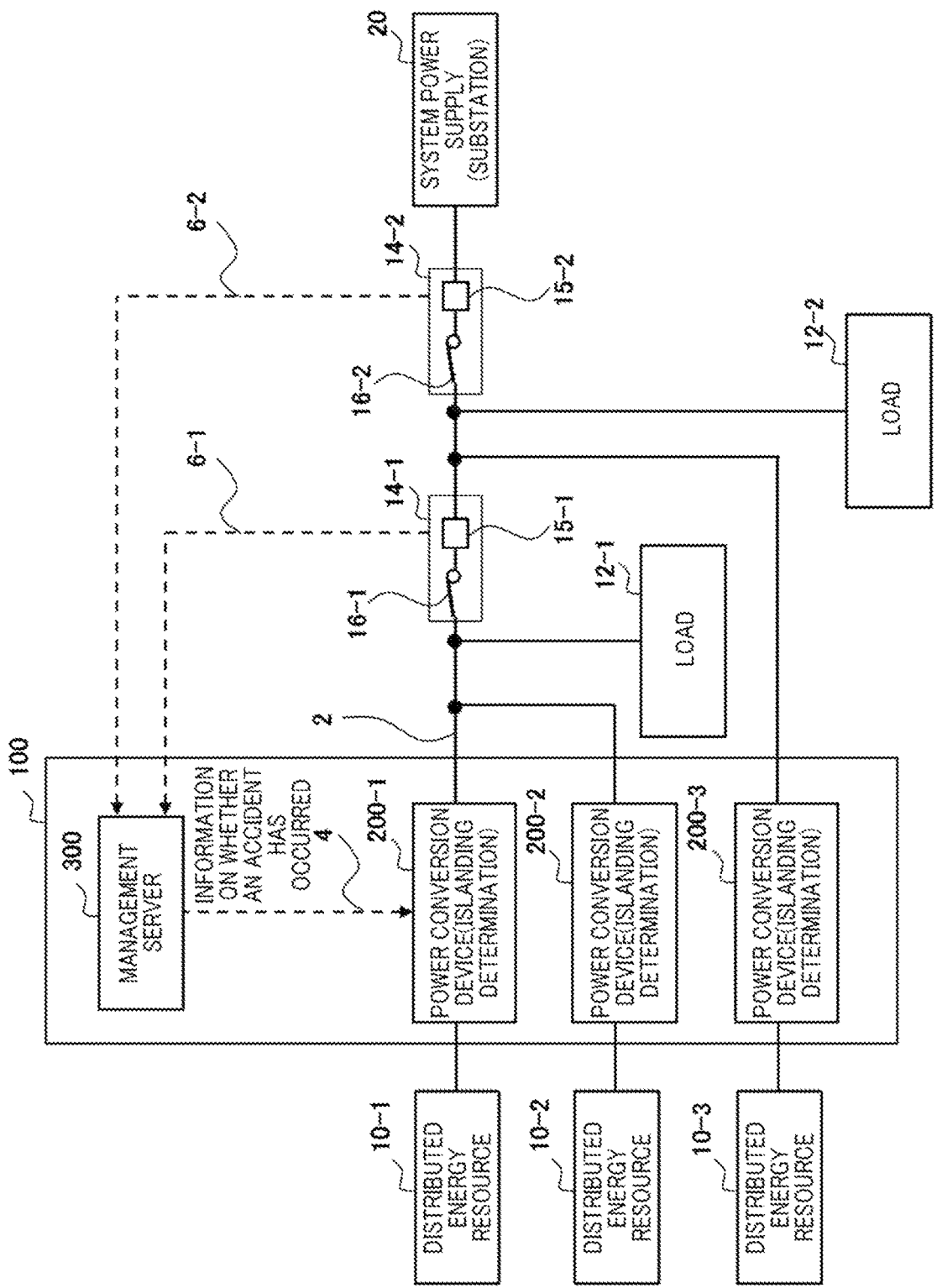
FIG. 1 shows an example of a power generation system 1 in one embodiment of the present invention.

FIG. 1 shows an example of a power generation system 1 in one embodiment of the present invention. FIG. 1 schematically shows a configuration of the power generation system 1. The power generation system 1 is a system installed in a power system 2. The power generation system 1 includes distributed energy resources 10-1, 10-2, and 10-3, loads 12-1 and 12-2, accident detection units 14-1 and 14-2, a system power supply 20, and a control system 100. The control system 100 may include a plurality of power conversion devices 200-1, 200-2, and 200-3 (may be collectively referred to as the power conversion device 200), and a management server 300. The number of each component is not limited to the case in FIG. 1. The power conversion device 200 may be a device referred to as a PCS (Power Conditioning System) or an inverter.

The system power supply 20 connected to the power system 2 may be a facility that supplies electrical power provided by an electrical power supplier managing the power system 2. The system power supply 20 may be a power plant, a substation or a transformer, as one example. In the present example, system power supply 20 is a substation. The power system 2 may be a distribution system under control of the system power supply 20. The loads 12-1 and 12-2 are facilities that receive supply of electric power and consume the electrical power. The distributed energy resources 10-1, 10-2, and 10-3 may be power sources such as a photovoltaic device with solar panels, a wind power generator, and a fuel cell power generator.

The accident detection units 14-1 and 14-2 (may be collectively referred to as an accident detection unit 14) may be installed at a plurality of predetermined locations in the power system 2. The accident detection unit 14-1 may include a sensor unit 15-1 and a switch 16-1. Similarly, the accident detection unit 14-2 may include a sensor unit 15-2 and a switch 16-2. The sensor unit 15-1 and the sensor unit 15-2 may include various sensors such as a current sensor which detects current such as ground fault current and short circuit current. The sensor units 15-1 and 15-2 may detect the occurrence of an accident such as a ground fault and the location where the accident has occurred in the power system 2, based on characteristic values of the measured current or the like.

The switches 16-1 and 16-2 may be an electromagnetic contactor (magnetic contactor). An electromagnetic contactor is a device which magnetically opens and closes a contact using an electromagnet, and is also called a contactor. However, the switches 16-1 and 16-2 are not limited to an electromagnetic contactor, and may be a breaker such as a relay. When the sensor units 15-1 and 15-2 detect the occurrence of an accident such as ground fault in the power system 2 and the location where the accident has occurred, a control signal may be transmitted to the switches 16-1 and 16-2 corresponding to the location where the accident has occurred. When receiving the control signals, the switches 16-1 and 16-2 become open and cut off power supply from the system power supply 20.

The management server 300 periodically acquires accident presence/absence information from the accident detection units 14-1 and 14-2. The period in which the management server 300 acquires accident presence/absence information is, for example, two seconds or less, more preferably, one second or less, and even more preferably, 0.2 seconds or less. The management server 300 may be managed by a system operator such as an electrical power supplier. However, the management server 300 is not limited thereto and may be managed by a manager of the power conversion devices 200-1, 200-2, and 200-3.

The accident presence/absence information may be information related to characteristic values of the current or the like measured by the sensor unit 15-1 and the sensor unit 15-2. In one example, the sensor unit 15-1 and the sensor unit 15-2 may transmit the accident presence/absence information not only to the switches 16-1 and 16-2, but also to the management server 300. The accident presence/absence information may include whether an accident has occurred and the location where the accident has occurred. On the other hand, the management server 300 may acquire information indicating the switching state of the switches 16-1 and 16-2 as the accident presence/absence information. For the switches 16-1 and 16-2, an open state indicates that an accident has occurred, and a closed state indicates that no accident occurred.

The management server 300 periodically transmits, to the power conversion devices 200-1, 200-2, and 200-3, information indicating whether an accident has occurred in the power system 2 as the transmission information, based on the accident presence/absence information acquired from the accident detection units 14-1 and 14-2. The management server 300 transmits the transmission information to the power conversion devices 200-1, 200-2, and 200-3 via the communication line 4. The communication line 4 may be a wired or wireless communication line. The management server 300 may receive the accident presence/absence information from the accident detection units 14-1 and 14-2 via the communication lines 6-1 and 6-2.

The power conversion device 200-1 converts electrical power generated by the distributed energy resource 10-1 into electrical power corresponding to the power system 2. The power conversion device 200-2 and the power conversion device 200-3 also converts electrical power generated by the distributed energy resources 10-2 and 10-3, respectively, in the same manner.

Each of the power conversion devices 200-1, 200-2, and 200-3 receives transmission information transmitted by the management server 300 as the reception information. To be specific, each of the power conversion devices 200-1, 200-2, and 200-3 receives information indicating whether an accident has occurred in the power system 2.

Each of the power conversion devices 200-1, 200-2, and 200-3 has an islanding determination function to determine whether the distributed energy resources 10-1, 10-2, and 10-3 are in an islanding state. However, the power conversion devices 200-1, 200-2, and 200-3 do not transition into the islanding determination process when they have received the reception information indicating that no accident occurred.

Therefore, the frequency of performing an islanding determination process can be reduced. As a result, the frequency of the power conversion devices 200-1, 200-2, and 200-3 separately performing the islanding determination process can be reduced. Since disconnection may be performed from a high-order management server 300 based on the reception information indicating whether an accident has occurred, the possibility of false detection may be reduced and the reliability may be further improved.

When the islanding determination process is performed in an active mode, reactive power is injected into the power system 2. Due to the reactive power injected into the power system, the voltage in the electrical line repeatedly changes, which may generate flicker which causes lighting at home or the like to get light and dark. In this respect, flicker may be prevented as much as possible since the frequency of performing the islanding determination process is reduced.

Figure 2:
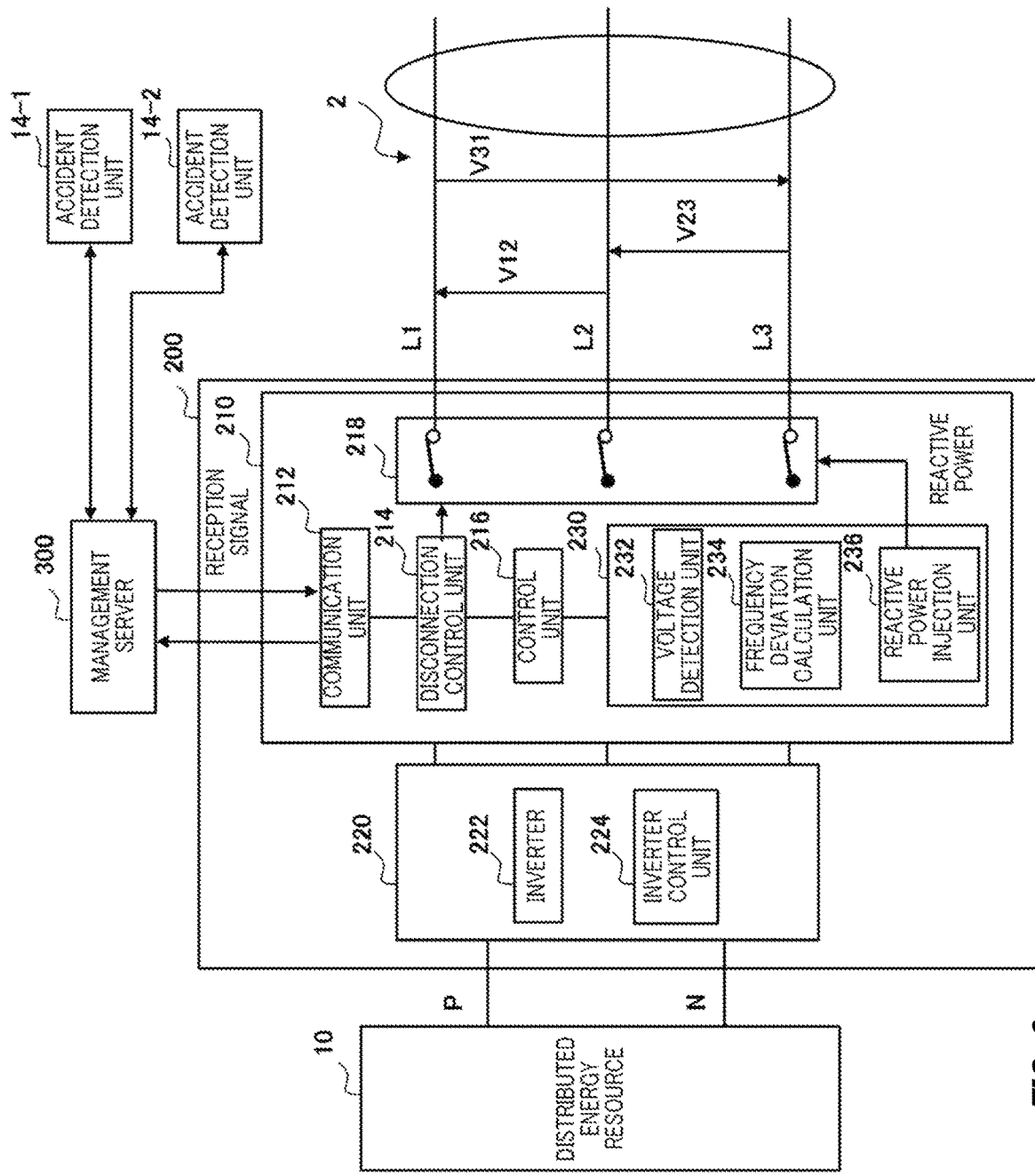
FIG. 2 shows an example of a configuration of a power conversion device 200 of the present invention.

FIG. 2 shows an example of a configuration of a power conversion device 200 of the present invention. The power conversion device 200 may include a control device 210 and a power conversion unit 220. The control device 210 may include a communication unit 212, a disconnection control unit 214, a control unit 216, a disconnection unit 218, and an islanding determination unit 230. Note that, the disconnection control unit 214, the control unit 216, and the islanding determination unit 230 may be implemented in software executed by a CPU or may be implemented in a hardware such as a logic circuit.

The power conversion unit 220 converts electrical power from the distributed energy resource 10 into AC power corresponding to the power system 2. The power conversion unit 220 includes an inverter 222 and an inverter control unit 224. In the present example, the power conversion unit 220 is connected to the positive terminal P and the negative terminal N of the distributed energy resource 10. In the present example, DC power is converted into three-phase AC power. The converted three-phase AC power is supplied to the power system 2 including power lines L1, L2, L3. However, unlike the present example, the power conversion unit 220 may convert electrical power from the distributed energy resource 10 into polyphase AC power other than three-phase AC power, or single-phase AC power.

The inverter 222 converts DC power or AC power from the distributed energy resource 10 into AC power that is compatible with the power system and outputs the converted AC power. The inverter control unit 224 controls the voltage, the frequency, and the phase of the AC power output by the inverter 222 to be compatible with the power on the power system side.

The communication unit 212 periodically receives, via communication, the reception information indicating whether an accident has occurred in the power system 2. In the present example, the communication unit 212 is communicatively connected to the management server 300 via the communication line 4. The communication unit 212 may receive the reception signal with a period of two seconds or less, and more preferably, receives the reception signal with a period of one second or less. Even more preferably, the communication unit 212 may receive the reception signal with a period of 0.2 seconds or less.

The communication unit 212 periodically receives the reception signal from the management server 300. The disconnection unit 218 disconnects the distributed energy resource 10 from the power system 2 when the communication unit 212 receives the reception information indicating accident occurrence. In one example, the disconnection unit 218 is an electromagnetic contactor (magnetic contactor). The disconnection control unit 214 controls the contact of the disconnection unit 218 to be open when the communication unit 212 receives the reception information indicating accident occurrence. In this manner, the power system 2 is cut off from the distributed energy resource 10.

The control unit 216 starts the islanding determination process when the communication unit 212 does not receive the reception information for a predetermined first period. In this case, the control unit 216 transmits, to the islanding determination unit 230, a control signal to cause the islanding determination process to start. The islanding determination process is a process to determine whether the distributed energy resource 10 is in an islanding state by detecting a change in AC characteristics in the power system 2.

The control unit 216 starts the islanding determination process also when the communication unit 212 receives an instruction to start the islanding determination process from the management server 300. In this case, the control unit 216 transmits, to the islanding determination unit 230, a control signal to cause the islanding determination process to start.

The islanding determination unit 230 performs the islanding determination process. The islanding determination unit 230 may include a voltage detection unit 232, a frequency deviation calculation unit 234, and a reactive power injection unit 236. The voltage detection unit 232 detects the voltage on the output side of the power conversion device 200 in the power system 2. In the present example, the voltage V12 between L1 and L2, the voltage V23 between L2 and L3, and the voltage V31 between L3 and L1 are detected in the three-phase AC power lines L1, L2, L3. The frequency deviation calculation unit 234 calculates the frequency based on the voltage detected by the voltage detection unit 232. Note that, the frequency deviation calculation unit 234 calculates the frequency deviation by taking the difference between the representative value (such as a mean value) of the frequency during a certain period and the representative value (such as a mean value) of the frequency during another period before said period. Note that, the frequency deviation calculation unit 234 may calculate a parameter related to the frequency deviation, instead of the frequency deviation itself. The frequency deviation calculation unit 234 may calculate a deviation of the period, which is the reciprocal of the frequency deviation.

The reactive power injection unit 236 increases frequency fluctuation by injecting reactive power corresponding to the frequency deviation into the power system 2. In other words, in the present example, the islanding determination process may be performed in an active mode in which it is determined whether the distributed energy resource is in an islanding state by detecting the change in AC characteristics when reactive power is injected into the power system 2. The islanding determination unit 230 determines that the distributed energy resource 10 is in an islanding state if the frequency deviation when reactive power is injected into the power system 2 is equal to or above a predetermined value. The disconnection unit 218 disconnects the distributed energy resource 10 from the power system 2 also when it is determined that the power conversion device is in an islanding state by the islanding determination process.

Figure 3:
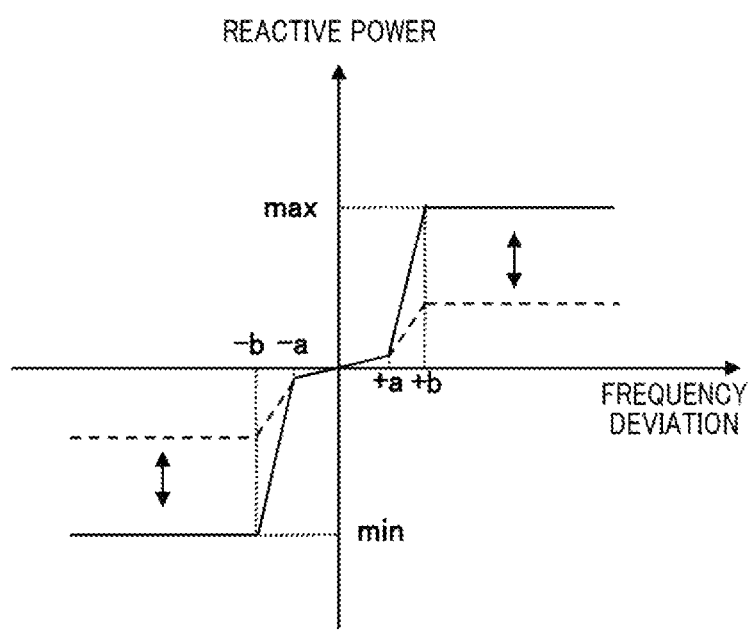
FIG. 3 shows an example of reactive power output characteristics in an islanding determination process.

FIG. 3 shows an example of reactive power output characteristics in an islanding determination process. The horizontal axis is the frequency deviation calculated by the frequency deviation calculation unit 234, and the vertical axis is the reactive power injected by the reactive power injection unit 236. The reactive power injection unit 236 can calculate the value of reactive power corresponding to the frequency deviation by referring to the reactive power output characteristics shown in FIG. 3. In the present example, a slope indicating the proportion of the amount of change in reactive power to the amount of change in frequency deviation when the absolute value of the frequency deviation is below a is smaller than a slope indicating the proportion of the amount of change in reactive power to the amount of change in frequency deviation when the absolute value of the frequency deviation is from a to b. In a range where the frequency deviation is above +b, the reactive power is constant at a maximum value (max). In a range where the absolute value of the frequency deviation is below −b, the reactive power is constant at a minimum value (min).

In FIG. 3, a first instance shown with a solid line and a second instance shown with a dotted line are illustrated as the reactive power output characteristics. In regions where the absolute value of the frequency deviation is from a to b, the slope indicating the proportion of the amount of change in reactive power to the amount of change in frequency deviation is larger in the first instance than in the second instance. The slope indicating the proportion of the amount of change in reactive power to the amount of change in frequency deviation is one example of parameter values for adjusting the reactive power output characteristics. In the present example, the parameter values for adjusting the reactive power output characteristics are adjustable. However, the parameter values for adjusting the reactive power output characteristic may be fixed.

Figure 4:
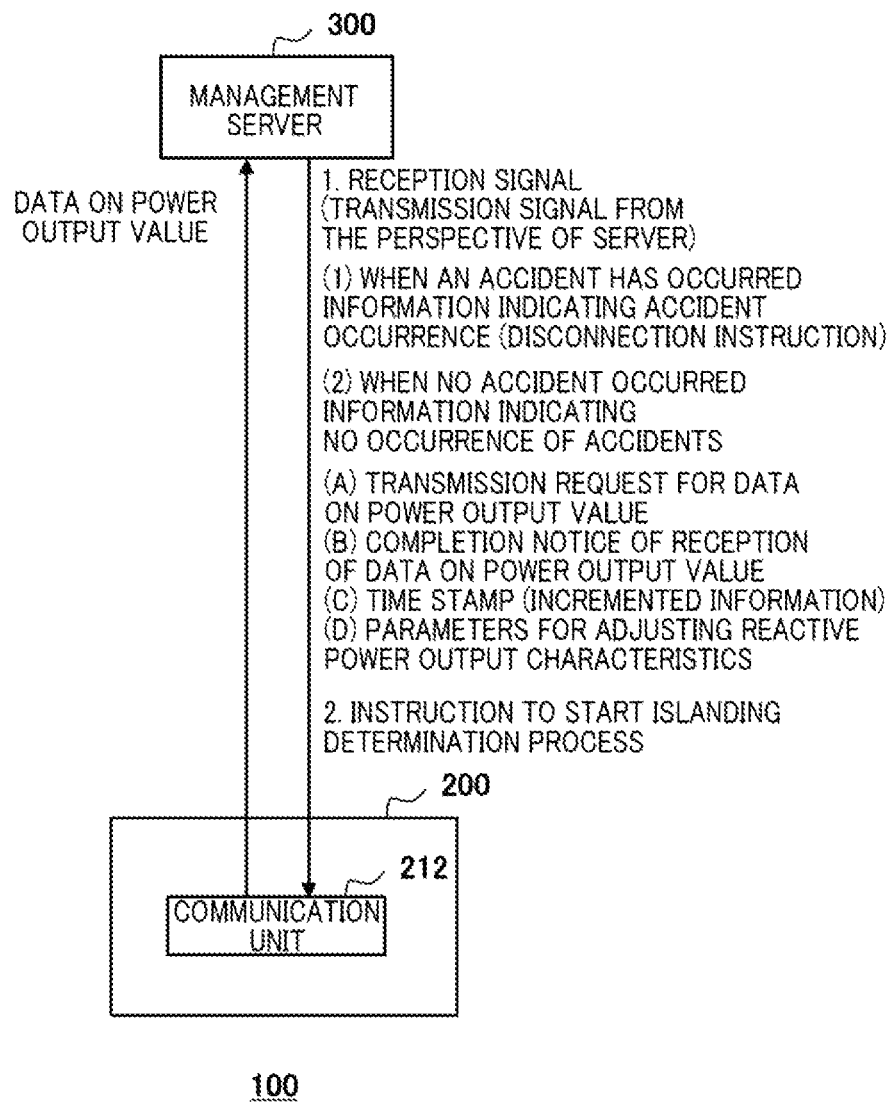
FIG. 4 is an example of the contents of communication between the power conversion device 200 and a management server 300.

FIG. 4 is an example of the contents of communication between the power conversion device 200 and the management server 300. The power conversion device 200 receives the transmission information transmitted from the management server 300 as the reception signal. The reception signal is a signal indicating whether an accident has occurred.

When an accident has occurred in the power system 2, the communication unit 212 receives a reception signal indicating accident occurrence. When the communication unit 212 receives the reception information indicating accident occurrence, the disconnection unit 218 disconnects the distributed energy resource 10 from the power system 2. Therefore, the reception signal indicating accident occurrence is equivalent to a disconnection instruction signal.

When no accident occurred in the power system 2, the communication unit 212 periodically receives the reception signal indicating no occurrence of accidents. The reception signal indicating no occurrence of accidents may be any signal as long as it is a signal that is received periodically. Therefore, reception signals used for other functions may also be used as the reception signal indicating no occurrence of accidents.

The reception information may include a transmission request for transmitting, to the management server 300, data on the power output value of the distributed energy resource 10, or a completion notice of reception of data on the power output value. Note that, the communication unit 212 which has received the transmission request may transmit data on the power output value to the management server 300.

When no accident occurred in the power system, the reception information may include information in which values are incremented sequentially. In one example, the incremented information may be a time stamp indicating the date and time when the management server 300 transmitted the information. In addition, the reception information may include parameter values for adjusting reactive power output characteristics. In one example, a value which indicates the slope indicating a proportion of the amount of change in reactive power to the amount of change in frequency deviation, as described in FIG. 3, may be received by the communication unit 212 as the reception information.

The communication unit 212 receives an instruction to start the islanding determination process. When the management server 300 cannot acquire accident presence/absence information from the accident detection units 14-1 and 14-2 due to communication error or the like in the communication lines 6-1 and 6-2, the management server 300 cannot determine whether an accident has occurred in the power system 2. In this case, an islanding determination process is performed in the power conversion device 200 which received the start instruction.

Figure 5:
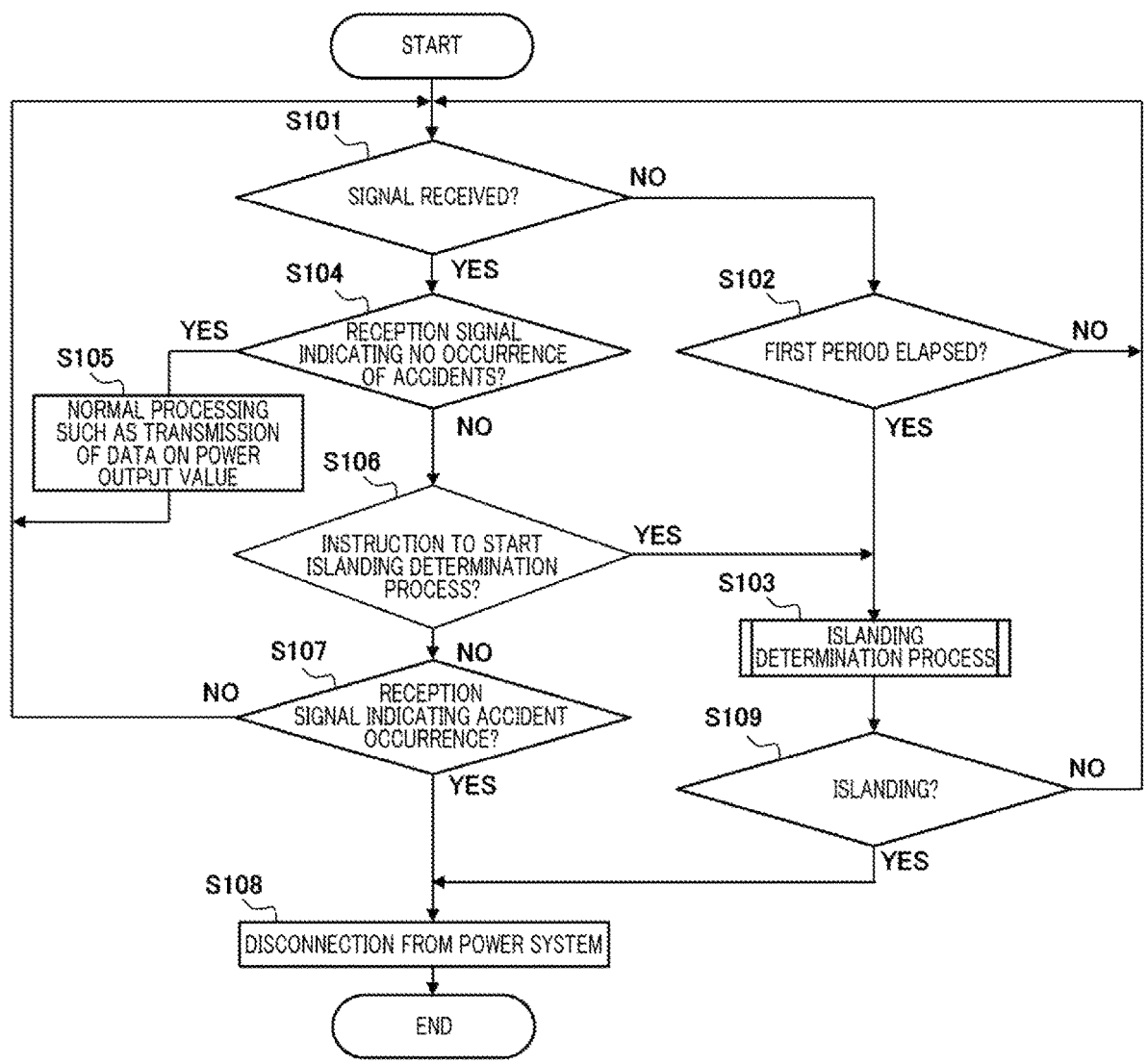
FIG. 5 is a flowchart showing an example of a process of the power conversion device 200.

FIG. 5 is a flowchart showing an example of a process of the power conversion device 200. When the communication unit 212 does not receive a reception signal for a predetermined first period (step S101: NO, step S102: YES), the islanding determination process is started (step S103).

When the communication unit 212 receives a reception signal indicating no occurrence of accidents (step S101: YES, step S104: YES), the control unit 216 does not start the islanding determination process. For example, when the reception signal indicating no occurrence of accidents is a transmission request of data on the power output value of the distributed energy resource 10, the communication unit 212 performs normal processes such as transmission of data on the power output value to the management server 300 (step S105). The communication unit 212 periodically receives the reception signal indicating no occurrence of accidents (step S101: YES).

When the communication unit 212 receives an instruction to start the islanding determination process (step S106: YES), the islanding determination process is started (step S103). On the other hand, when the communication unit 212 receives a reception signal indicating accident occurrence (step S106: NO, step S107: YES), the disconnection unit 218 disconnects the distributed energy resource 10 from the power system 2 (step S108).

The islanding determination unit 230 performs the islanding determination process (step S103) only when the communication unit 212 does not receive the reception signal for a first period (step S102: YES), or receives an instruction to start the islanding determination process from the management server 300 (step S106: YES). During the islanding determination process, when the distributed energy resource 10 is determined to be in an islanding state (step S109: YES), the distributed energy resource 10 is disconnected from the power system 2. When the distributed energy resource 10 is not determined to be in an islanding state (step S109: NO), the process returns to step S101.

Figure 6:
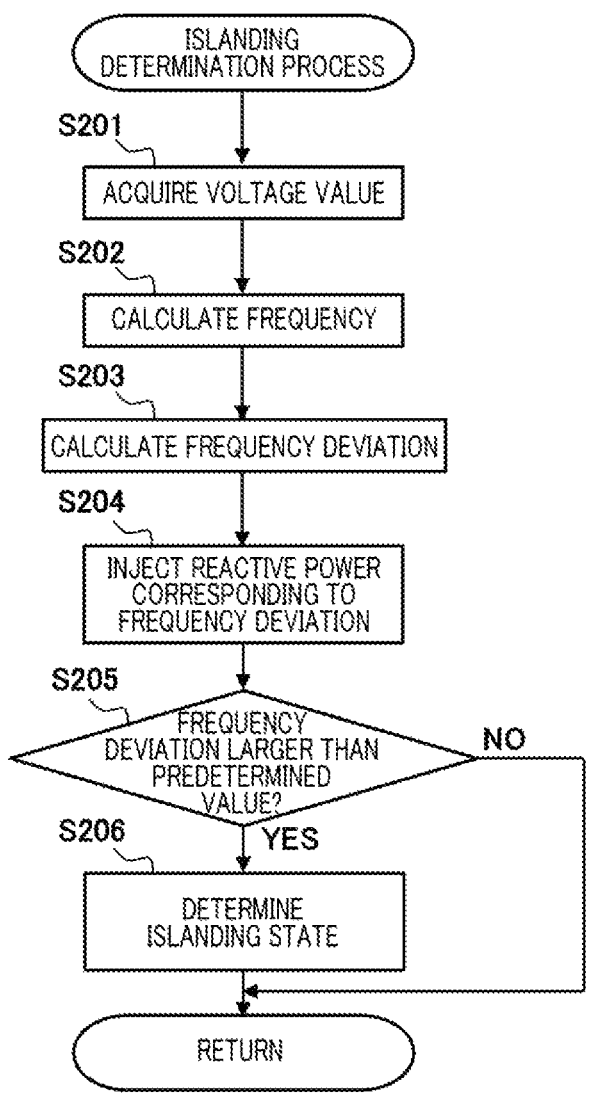
FIG. 6 is a flowchart showing an example of an islanding determination process.

FIG. 6 is a flowchart showing an example of an islanding determination process at step S103 in FIG. 5. The islanding determination process may adopt the standard-type active islanding detection method defined in the Japan Electrical Manufacturers' Association standard JEM1498. The voltage detection unit 232 detects the voltage on the output side of the power conversion device 200 in the power system 2 (step S201).

The frequency deviation calculation unit 234 calculates the frequency of the AC signal based on the voltage detected by the voltage detection unit 232 (step S202). The frequency deviation calculation unit 234 calculates the frequency deviation by taking the difference between the representative value (such as a mean value) of the frequency during a certain period and the representative value (such as a mean value) of the frequency during another period before said period (step S203). The reactive power injection unit 236 injects reactive power corresponding to the frequency deviation into the power system 2 (step S204).

Frequency deviation is calculated by a method similar to that performed at steps S201 to S203, in the situation that reactive power corresponding to the frequency deviation is injected into the power system 2. The islanding determination unit 230 determines whether the absolute value of the frequency deviation in the situation that reactive power is injected into the power system 2 is larger than a predetermined value (step S205). If the absolute value of the frequency deviation in the situation that reactive power is injected into the power system 2 is larger than the predetermined value (step S205: YES), the islanding determination unit 230 determines that the distributed energy resource 10 is in an islanding state (step S206).

According to the power conversion device 200 in the present embodiment as described above, the islanding determination process is not always periodically performed, but the islanding determination unit 230 performs the islanding determination process only when the communication unit 212 does not receive a reception signal for a first period (step S102: YES), or receives an instruction to start the islanding determination process from the management server 300 (step S106: YES).

In addition, when occurrence of an accident in the power system 2 is detected by the accident detection units 14-1 and 14-2, the power conversion device 200 receives the reception information indicating accident occurrence via the management server 300. Therefore, the power conversion device 200 can disconnect the distributed energy resource 10 from the power system 2 without performing an islanding determination process by itself.

Therefore, the frequency of the power conversion device 200 having to separately perform an islanding determination process can be reduced. As long as the reception information from the management server 300, which is a high-order server, can be received, the power conversion device 200 can determine whether to disconnect the distributed energy resource 10 from the power system 2, based on the reception information. Therefore, reliability can be further improved.

In addition, even when adopting an active mode as the islanding determination process, injection of reactive power into the power system 2 during the islanding determination process can be suppressed. As a result, voltage fluctuation due to the reactive power can be prevented, and voltage flicker can be suppressed.

Various signals for implementing other functions may also be used as the reception signal indicating no occurrence of accidents. To be specific, a signal including information of at least one of a transmission request of data on the power output value, a completion notice of reception of data on the power output value, a time stamp (incremented information), and parameters for adjusting reactive power output characteristics may be utilized as the reception signal indicating no occurrence of accidents.

Figure 7:
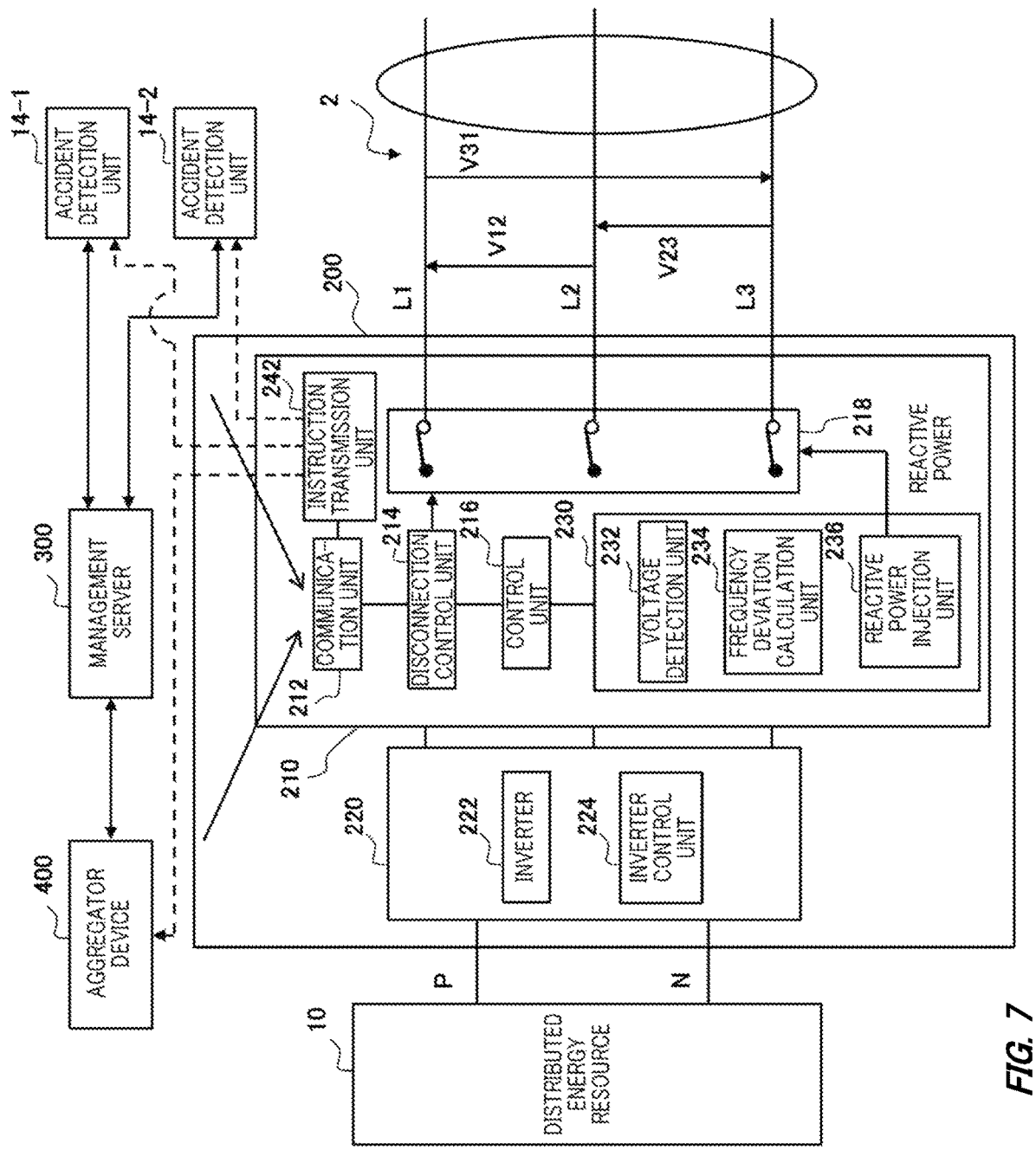
FIG. 7 shows another example of a configuration of the power conversion device 200.

FIG. 7 shows another example of a configuration of the power conversion device 200. For the power conversion device 200 in FIGS. 2-6, the communication unit 212 has been described with a case in which the reception signal is periodically received from the management server 300. However, the present invention is not limited thereto.

When the communication unit 212 does not receive the reception information from the management server 300 for a predetermined second period, the communication unit 212 may receive the reception information from at least one other device that is different from the management server 300.

In FIG. 7, an aggregator device 400 and a plurality of accident detection units 14-1, 14-2 are shown as examples of other devices. The aggregator device 400 is communicatively connected to the management server 300 and the power conversion device 200. The aggregator device 400 is a device which manages the demand and supply of electrical power.

The power conversion device 200 includes an instruction transmission unit 242. When the communication unit 212 does not receive the reception information from the management server 300 for the predetermined second period, the instruction transmission unit 242 transmits, to the aggregator device 400, an instruction to acquire the reception information from the management server 300 and to transmit the reception information.

The plurality of accident detection units 14-1, 14-2 themselves may be communicatively connected to the power conversion device 200 via communication lines. The plurality of accident detection units 14-1, 14-2 is installed at a plurality of predetermined locations in the power system 2.

When the communication unit 212 does not receive the reception information from the management server 300 for the predetermined second period, the instruction transmission unit 242 transmits, to the plurality of the accident detection units 14-1 and 14-2, an instruction to transmit the reception information. The accident detection units 14-1 and 14-2 may receive the accident presence/absence information as the reception information. The accident presence/absence information may include information related to characteristic values of the current or the like measured by the sensor unit 15-1 and the sensor unit 15-2. The accident presence/absence information may include information indicating the switching state of the switches 16-1 and 16-2.

Figure 8:
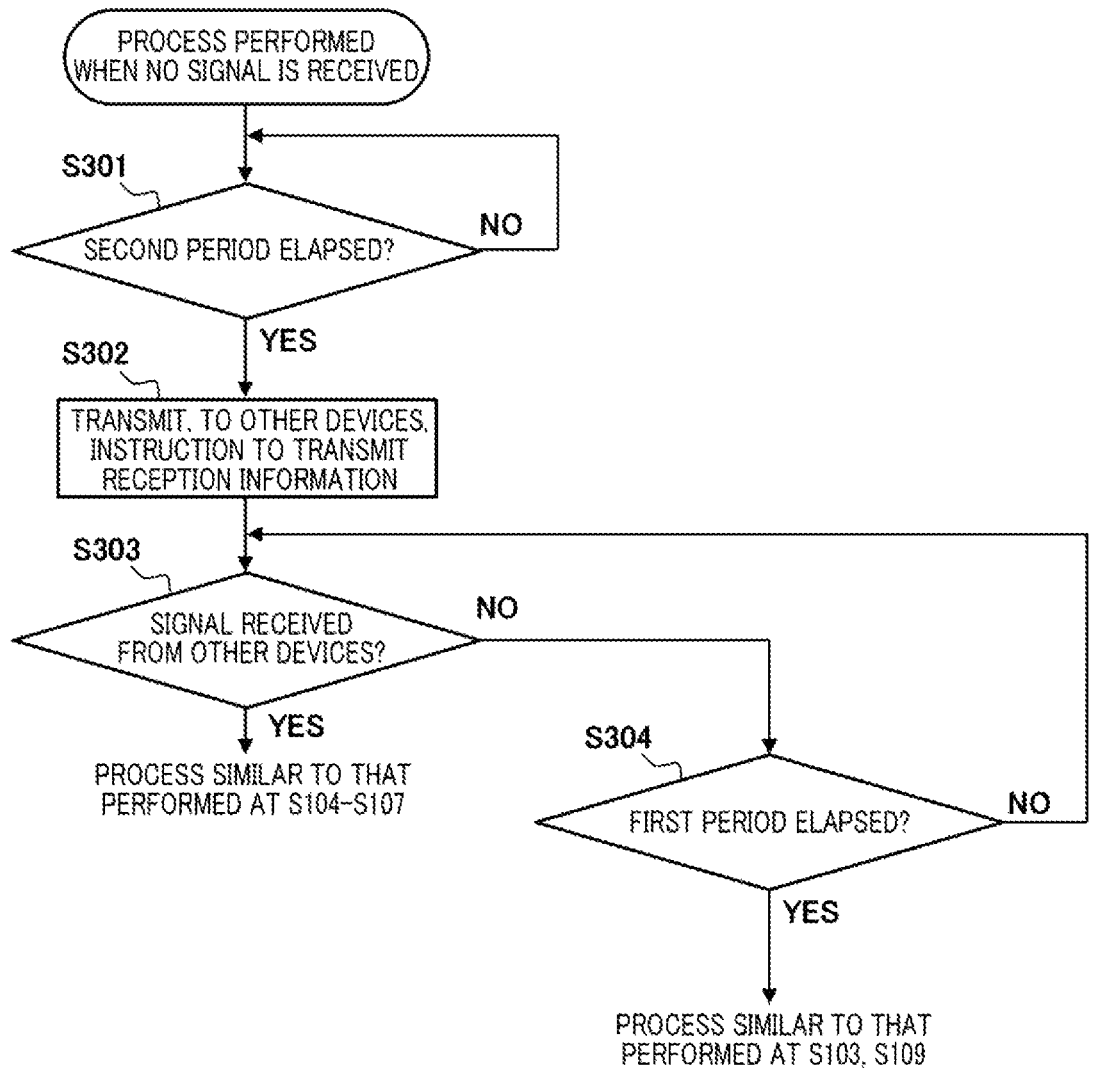
FIG. 8 is a flowchart showing an example of a process when no signal is received from the management server 300 in the power conversion device 200 shown in FIG. 7.

FIG. 8 is a flowchart showing an example of a process performed when no signal is received from the management server 300 in the power conversion device 200 shown in FIG. 7. When the second period elapses without the communication unit 212 receiving a signal from the management server 300 (step S301: YES), the instruction transmission unit 242 transmits, to the other devices, an instruction to transmit the reception information (step S302). When a signal is received from the other devices (step S303: YES), a process similar to that performed at steps S104-S107 shown in FIG. 5 may be performed. When a signal is not received from the other devices for a first period (step S303: NO, step S304: YES), a process similar to that performed at steps S103 and S109 shown in FIG. 5 may be performed.

According to the power conversion device 200 shown in FIG. 7 and FIG. 8, due to the condition of the communication line, the reception information is received from the other devices even when the reception information cannot be received from the management server 300. Therefore, even when the reception information cannot be received from the management server 300, as long as the communication unit 212 is able to receive the reception information indicating no occurrence of accidents in the power system 2 from the other devices, the control unit 216 does not start the islanding determination process by the islanding determination unit 230. As a result, the frequency of the power conversion device 200 having to separately perform an islanding determination process can be reduced. As long as the reception information from any of the devices can be received, the power conversion device 200 can determine whether to disconnect the distributed energy resource 10 from the power system 2, based on the reception information. Therefore, reliability can be further improved. In addition, injection of reactive power into the power system 2 during the islanding determination process can be suppressed. As a result, voltage fluctuation due to the reactive power can be prevented, and voltage flicker can be suppressed.

In addition, when the reception information can be received from the management server 300, communication traffic can be reduced since the reception information does not need to be received from the plurality of accident detection units 14-1, 14-2.

Figure 9:
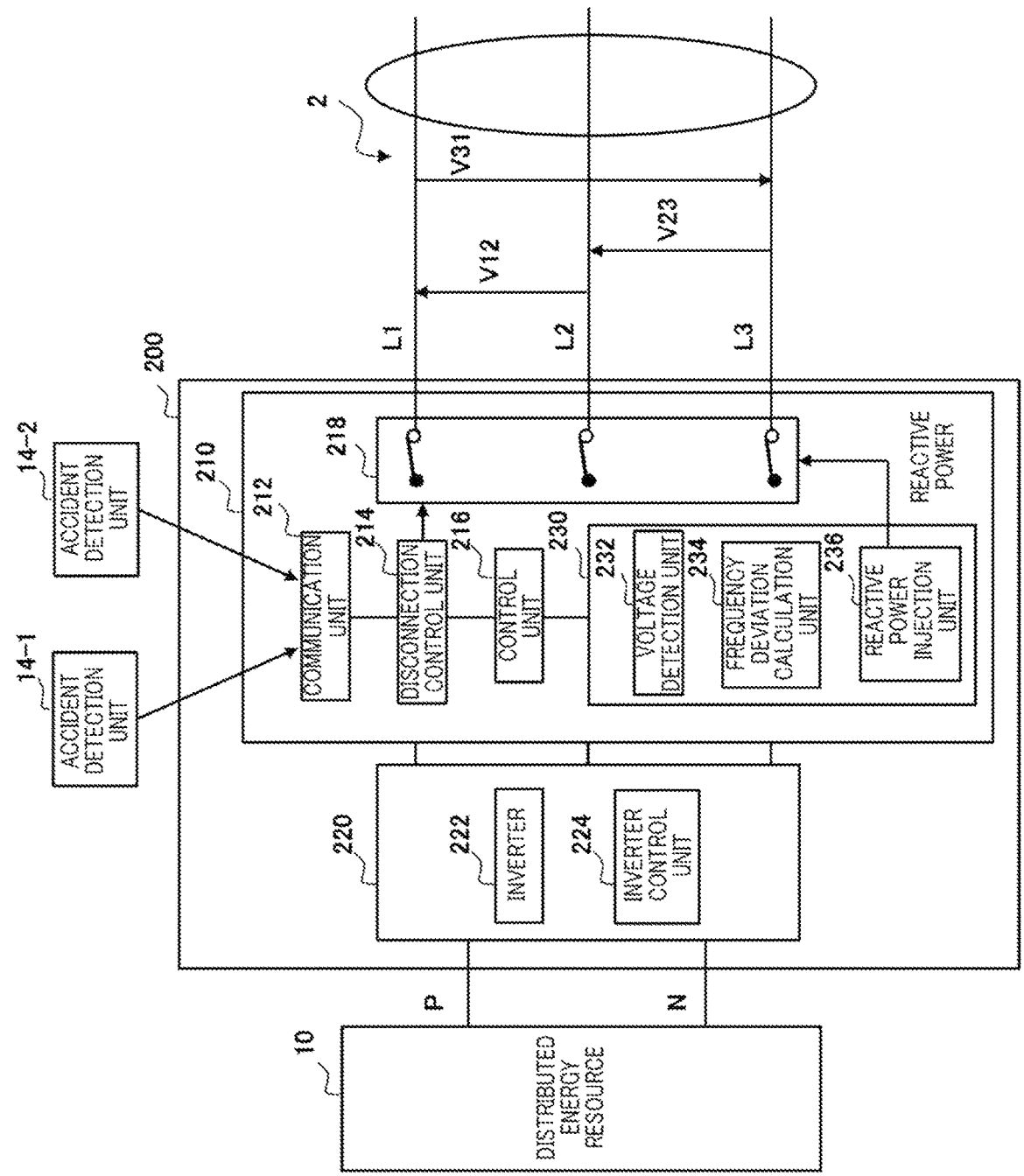
FIG. 9 shows another example of a configuration of the power conversion device 200.

FIG. 9 shows another example of a configuration of the power conversion device 200. In the power conversion device 200 shown in FIG. 9, the communication unit 212 is communicatively connected to a plurality of accident detection units 14-1, 14-2 installed at a plurality of predetermined locations in the power system 2 via a communication line. The communication unit 212 receives the reception information from each of the plurality of accident detection units 14-1, 14-2. The communication unit 212 may receive the accident presence/absence information as the reception information. The accident presence/absence information may include information related to characteristic values of the current or the like measured by the sensor unit 15-1 and the sensor unit 15-2. The accident presence/absence information may include information indicating the switching state of the switches 16-1 and 16-2. An open state indicates that an accident has occurred, and a closed state indicates that no accident occurred.

In the present example, the plurality of accident detection units 14-1, 14-2 have a communication function. The plurality of accident detection units 14-1, 14-2 may prestore the destination information of the power conversion device 200 with which they communicate. The destination information may be updated periodically. The accident detection units 14-1, 14-2 directly transmit the transmission information to the destination of the power conversion device 200 using IoT techniques. The communication unit 212 receives each transmission information from the accident detection units 14-1, 14-2 as the reception information. With the exception that the communication unit 212 receives the reception information from the plurality of accident detection units 14-1, 14-2, instead of the communication unit 212 receiving the reception information from the management server 300, the configuration of the power conversion device 200 in the present example is similar to the configurations shown in FIGS. 2-8. Therefore, the description will not be repeated.

According to the present example, even when there is no management server 300, the frequency of performing an islanding determination process can be reduced. As long as the reception information from the plurality of accident detection units 14-1, 14-2 can be received, it can be determined whether to disconnect the distributed energy resource 10 from the power system 2, based on the reception information. Therefore, reliability can be further improved. In addition, repeated fluctuation of voltage in the electric line which is due to the reactive power injected to the power system in an islanding determination process is prevented. Therefore, flicker that causes lighting at home or the like to get light and dark is prevented as much as possible.

In FIG. 2, FIG. 7, and FIG. 9, a case in which one power conversion device 200 is configured by a control device 210 and a power conversion unit 220 is shown. However, the control device 210 may be a control device that is separate from the power conversion device.

Figure 10:
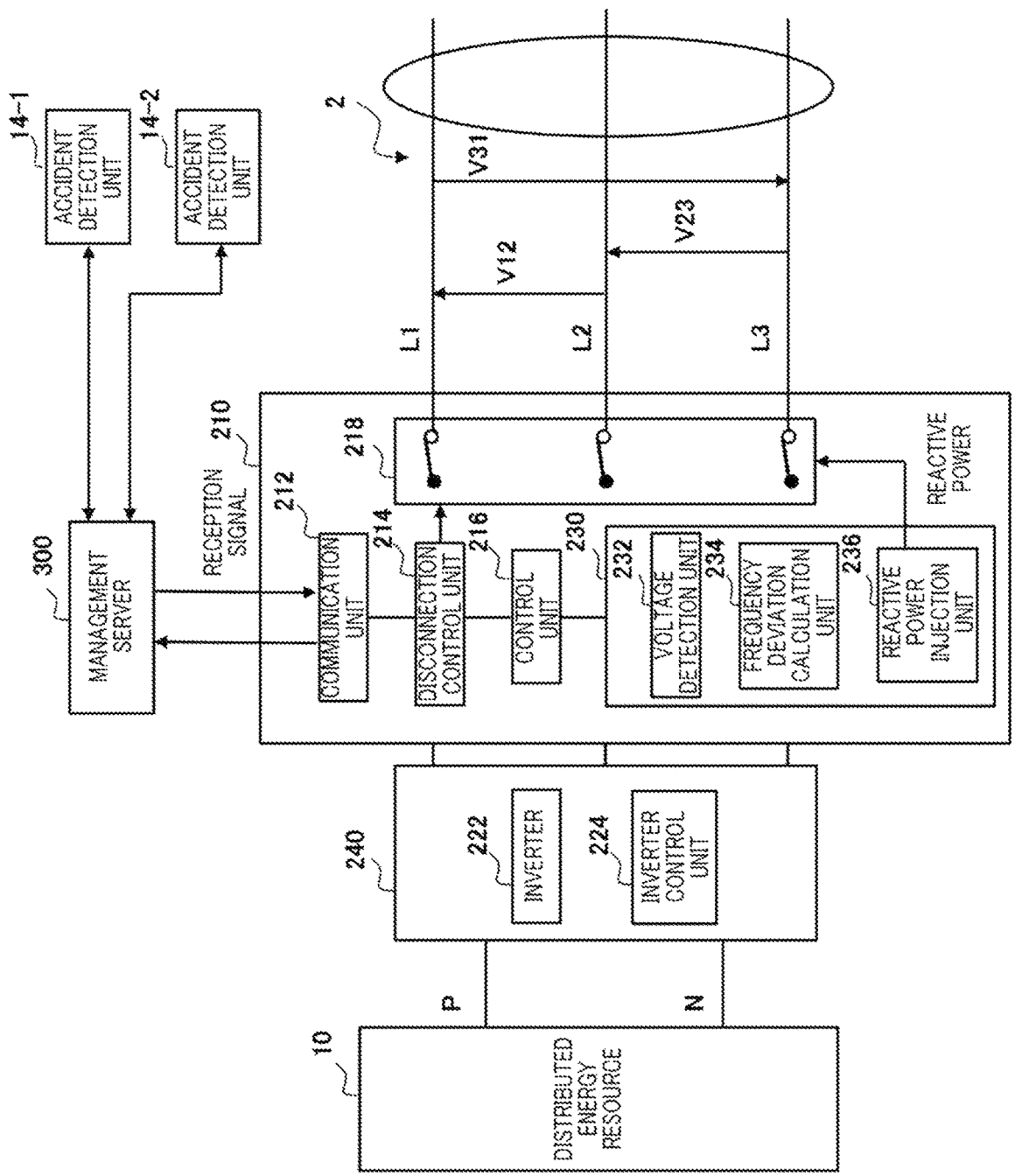
FIG. 10 shows an example in which a power conversion device 240 and a control device 210 are configured separately.

FIG. 10 shows an example in which a power conversion device 240 and a control device 210 are configured separately. The power conversion device 240 has a configuration that is similar to that of the power conversion unit 220 in FIG. 2, FIG. 7, and FIG. 9. The control device 210 is a control device 210 which controls the power conversion device 240 that converts electrical power generated by the distributed energy resource 10 into electrical power corresponding to the power system. The control device 210 includes a communication unit 212, a disconnection unit 218, and a control unit 216.

The communication unit 212 periodically receives, via communication, the reception information indicating whether an accident has occurred in the power system 2. When the communication unit 212 receives the reception information indicating accident occurrence, the disconnection unit 218 disconnects the distributed energy resource 10 from the power system 2. When the communication unit 212 does not receive the reception information for a predetermined first period, the control unit 216 determines whether the distributed energy resource 10 is in an islanding state by detecting the change in AC characteristics when reactive power is injected into the power system 2.

The frequency of performing the islanding determination process can also be reduced by connecting the control device 210 to the outside of a conventional power conversion device 240 as such. As long as the reception information from the management server 300, which is a high-order server, can be received, it can be determined whether to disconnect the distributed energy resource 10 from the power system 2, based on the reception information. Therefore, reliability can be further improved. As a result, repeated fluctuation of voltage in the electric line which is due to the reactive power injected to the power system in an islanding determination process is prevented.

In FIGS. 1-10, a case in which the islanding determination process is an active mode which involves injection of reactive power has been described. However, the present invention is not limited thereto.

Figure 11:
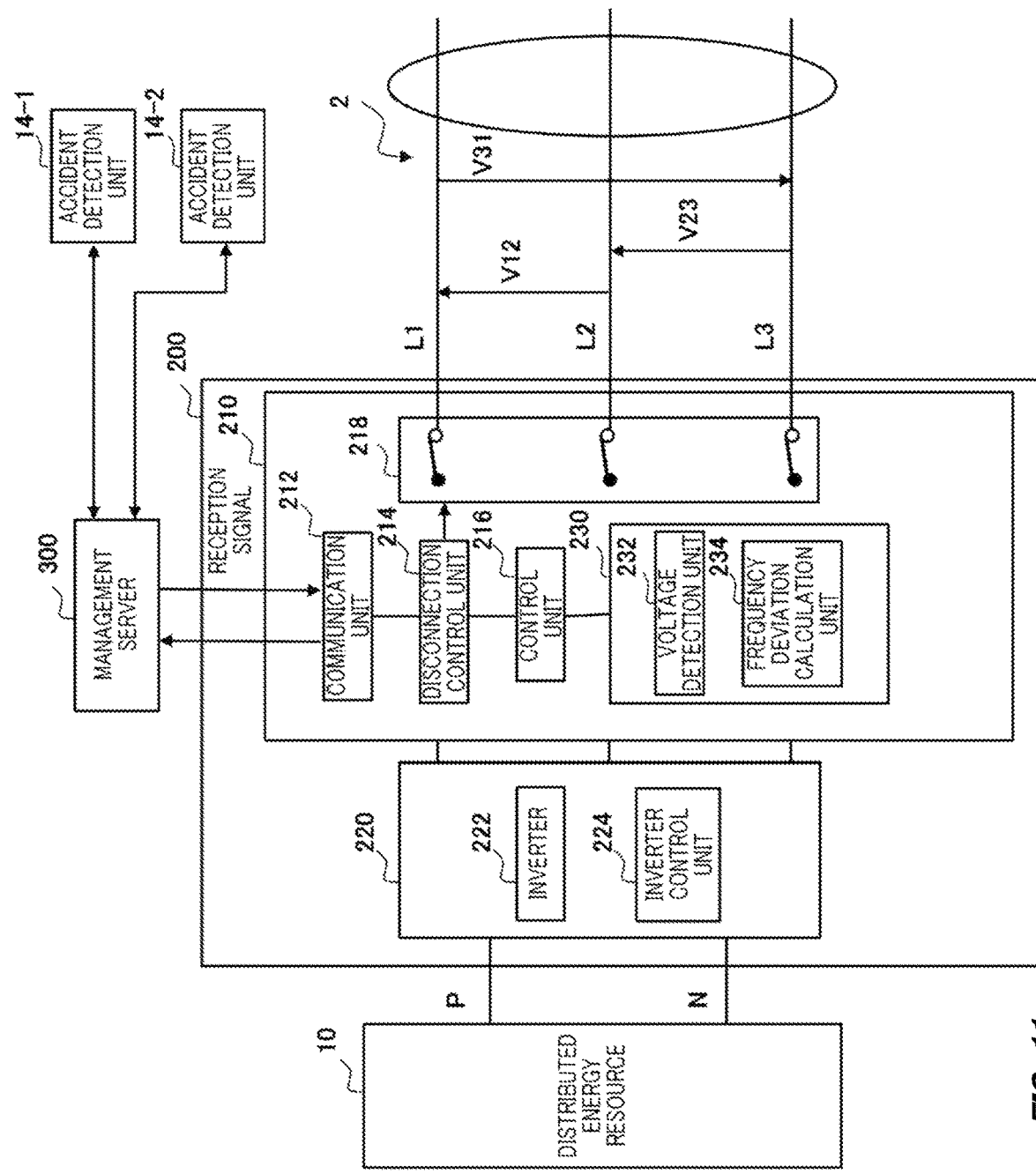
FIG. 11 shows another example of a configuration of the power conversion device 200.

FIG. 11 shows another example of a configuration of the power conversion device 200. In the power conversion device 200 shown in FIG. 11, the islanding determination unit 230 does not have the reactive power injection unit 236. In other words, the islanding determination process shown in FIG. 11 is a passive mode that does not involve injection of reactive power. The islanding determination unit 230 in FIG. 11 determines whether the distributed energy resource 10 is in an islanding state by detecting a change in AC characteristics resulting from the distributed energy resource 10 being separated from the linkage with the power system 2 and transitioning into an islanding state. The other configurations are similar to the configuration described in FIGS. 1-10 and therefore, detailed description will not be repeated.

Figure 12:
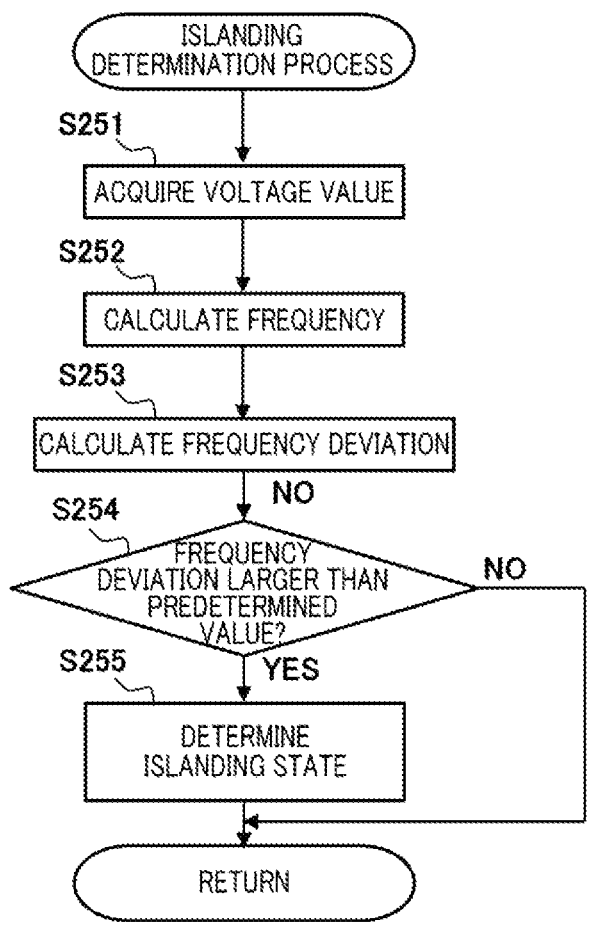
FIG. 12 is a flowchart showing another example of an islanding determination process.

FIG. 12 is a flowchart showing another example of an islanding determination process at step S103 in FIG. 5. FIG. 12 shows an example of the contents of the islanding determination process which is in a passive mode that does not involve injection of reactive power, as shown in FIG. 11.

The voltage detection unit 232 detects the voltage on the output side of the power conversion device 200 in the power system 2 (step S251). The frequency deviation calculation unit 234 calculates the frequency of the AC signal based on the voltage detected by the voltage detection unit 232 (step S252). The frequency deviation calculation unit 234 calculates the frequency deviation by taking the difference between the representative value (such as a mean value) of the frequency during a certain period and the representative value (such as a mean value) of the frequency during another period before said period (step S253). The islanding determination unit 230 determines whether the frequency deviation which is the difference between the representative value of the frequency during a certain period and the representative value of the frequency during another period is larger than a predetermined value (step S254). If the absolute value of the frequency deviation is larger than the predetermined value (step S254: YES), the islanding determination unit 230 determines that the distributed energy resource 10 is in an islanding state (step S255).

Even when an islanding determination process is performed in a passive mode as described above, the frequency of the power conversion device 200 having to separately perform an islanding determination process can be reduced. As long as the reception information can be received, it can be determined whether to disconnect the distributed energy resource 10 from the power system 2, based on the reception information. Therefore, reliability can be further improved.

Figure 13:
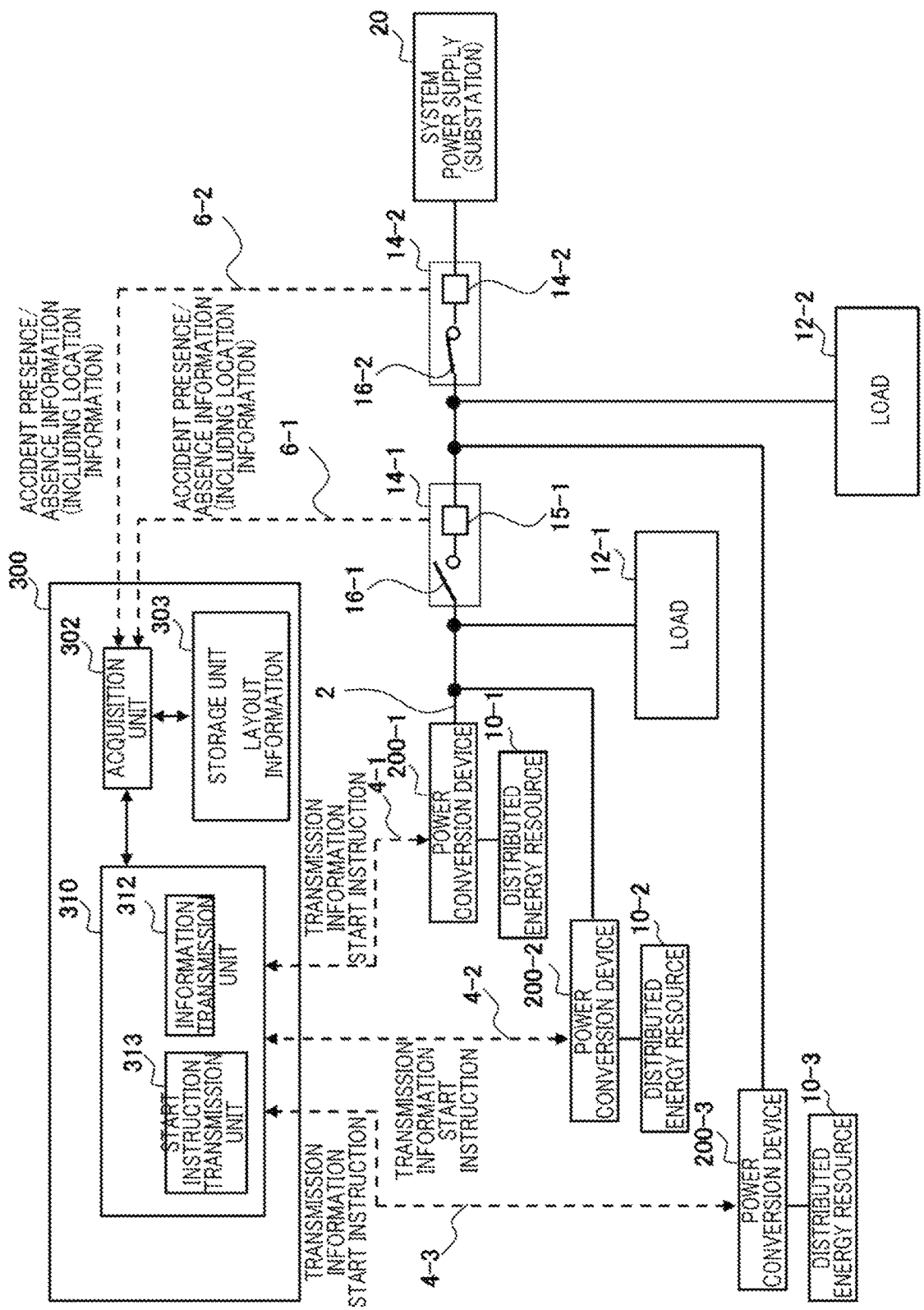
FIG. 13 shows an example of the management server 300.

FIG. 13 shows an example of the management server 300. The management server 300 is capable of mutually communicating with a plurality of power conversion devices 200-1, 200-2, and 200-3 which convert electrical power generated by respective distributed energy resources 10-1, 10-2, and 10-3 into electrical power corresponding to the power system. The management server 300 may include an acquisition unit 302, a storage unit 303, and a communication unit 310. The communication unit 310 may include an information transmission unit 312 and a start instruction transmission unit 313. The communication unit 310 is used to communicate with the outside.

The acquisition unit 302 acquires, from the plurality of accident detection units 14-1, 14-2 installed at a plurality of predetermined locations in the power system 2, information on whether an accident has occurred in the power system 2, via communication lines 6-1, 6-2. The information transmission unit 312 periodically transmits the transmission information indicating no occurrence of accidents via the communication lines 4-1, 4-2, and 4-3, when no accident occurred in the power system 2. The period may be two seconds or less, more preferably, may be one second or less, and even more preferably, may be 0.2 seconds or less.

When it is determined that an accident has occurred in the power system 2 based on the information acquired from the plurality of accident detection units 14-1, 14-2, the information transmission unit 312 transmits, to the one or more power conversion devices 200-1 and 200-2, the transmission information indicating accident occurrence to disconnect, from the power system 2, the one or more distributed energy resources 10-1 and 10-2 which are associated with the location of where the accident has occurred in the power system 2, among the distributed energy resources 10-1, 10-2, and 10-3.

Information on whether an accident has occurred in the power system 2 from each of the accident detection units 14-1 and 14-2 may include location information of where the accident has occurred. In the storage unit 303, layout information indicating the connection of each node in the power system 2 is stored. The acquisition unit 302 refers to the acquired location information of where the accident has occurred and the layout information in the storage unit 303. In this manner, the acquisition unit 302 can identify the one or more distributed energy resources 10-1 and 10-2 which are associated with the location of the accident occurrence in the power system 2, among the distributed energy resources 10-1, 10-2, and 10-3.

In FIG. 13, a case in which the accident detection unit 14-1, among the plurality of accident detection units 14-1 and 14-2, detects an accident is illustrated. At the accident detection unit 14-1, the sensor unit 15-1 detects occurrence of an accident such as ground current. The sensor unit 15-1 transmits a control signal to the switch 16-1, thereby causing the switch 16-1 to be open, so that the power system 2 is disrupted between the load 12-1 and the system power supply (substation) 20.

The distributed energy resources 10-1 and 10-2 connected to the downstream of the location of the accident occurrence, as seen from the system power supply (substation) 20, are the distributed energy resource associated with the location where the accident has occurred. On the other hand, the distributed energy resource 10-3 connected to the upstream from the location where the accident has occurred, as seen from the system power supply (substation) 20, is not associated with the location where the accident has occurred. Here, the downstream means the terminal side as seen from the system power supply 20, and the upstream means the side closer to the system power supply 20.

The information transmission unit 312 transmits, to the power conversion devices 200-1, 200-2 corresponding to the distributed energy resources 10-1, 10-2, the transmission information indicating accident occurrence, to disconnect, from the power system 2, the distributed energy resources 10-1, 10-2 associated with the location where the accident has occurred in the power system 2. On the other hand, the information transmission unit 312 does not disconnect, from the power system 2, the distributed energy resource 10-3 which is not associated with the location where the accident has occurred in the power system 2. The information transmission unit 312 periodically transmits, to the power conversion device 200-3 corresponding to the distributed energy resource 10-3, transmission information indicating no occurrence of accidents. In the present example, the information transmission unit 312 transmits transmission information indicating accident occurrence to some of the power conversion devices 200-1, 200-2, among the plurality of power conversion devices 200-1, 200-2, and 200-3, while transmitting the transmission information indicating no occurrence of accidents to the other power conversion device 200-3.

When the acquisition unit 302 cannot acquire the information on whether an accident has occurred from one or more accident detection units 14-1 and 14-2, among a plurality of accident detection units 14-1 and 14-2, for a predetermined period, the start instruction transmission unit 313 transmits, to the one or more power conversion devices associated with an installed location of the one or more accident detection units 14-1 and 14-2 in the power system 2, an instruction to start an islanding determination process.

For example, when information on whether an accident has occurred cannot be acquired from the accident detection unit 14-1, among the plurality of accident detection units 14-1 and 14-2, but information on whether an accident has occurred can be acquired from the accident detection unit 14-2, the start instruction transmission unit 313 transmits an instruction to start the islanding determination process to the power conversion devices 200-1 and 200-2 associated with the installed location of the accident detection unit 14-1 in the power system 2. On the other hand, the start instruction transmission unit 313 does not transmit an instruction to start the islanding determination process to the power conversion device 200-3.

Figure 14:
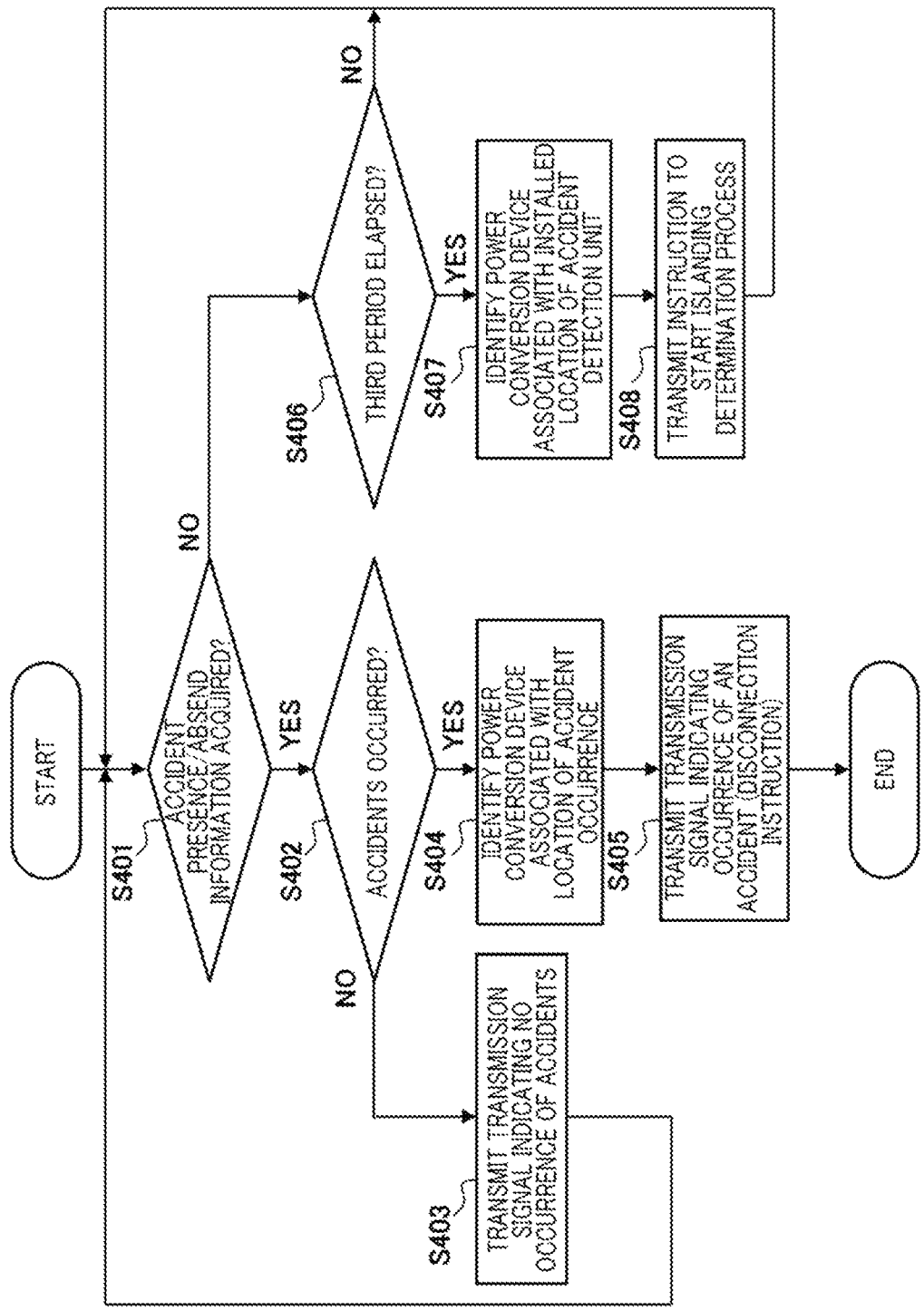
FIG. 14 is a flowchart showing an example of a process of the management server 300.

FIG. 14 is a flowchart showing an example of a process of the management server 300. The acquisition unit 302 acquires, via the communication lines 6-1, 6-2, information on whether an accident has occurred in the power system 2 from a plurality of accident detection units 14-1, 14-2 (step S401: YES). When no accident occurred (step S402: NO), the information transmission unit 312 periodically transmits, via the communication lines 4-1, 4-2, and 4-3, transmission information indicating no occurrence of accidents. The period may be two seconds or less, more preferably, may be one second or less, and even more preferably, may be 0.2 seconds or less.

When an accident has occurred (step S402: YES), the acquisition unit 302 identifies the one or more distributed energy resources 10-1 and 10-2 associated with the location of the accident occurrence in the power system 2 (step S404). The information transmission unit 312 transmits, to the power conversion devices 200-1, 200-2 corresponding to the distributed energy resources 10-1, 10-2, the transmission information (disconnection instruction) indicating accident occurrence, to disconnect, form the power system 2, the distributed energy resources 10-1, 10-2 associated with the location where the accident has occurred in the power system 2 (step S405).

Note that, when the acquisition unit 302 cannot acquire information on whether an accident has occurred from one or more accident detection units among the plurality of accident detection units 14-1 and 14-2 for a predetermined third period (step S406: YES), the acquisition unit 302 identifies the one or more power conversion devices 200-1 and 200-2 associated with the installed location in the power system 2 of said one or more accident detection units 14-1 and 14-2 from which the acquisition unit 302 cannot acquire the information (step S407). The start instruction transmission unit 313 transmits, to the identified one or more power conversion devices 200-1 and 200-2, an instruction to start the islanding determination process (step S408).

Transmission signals used for other functions can also be used as the transmission signal indicating no occurrence of accidents.

Figure 15:
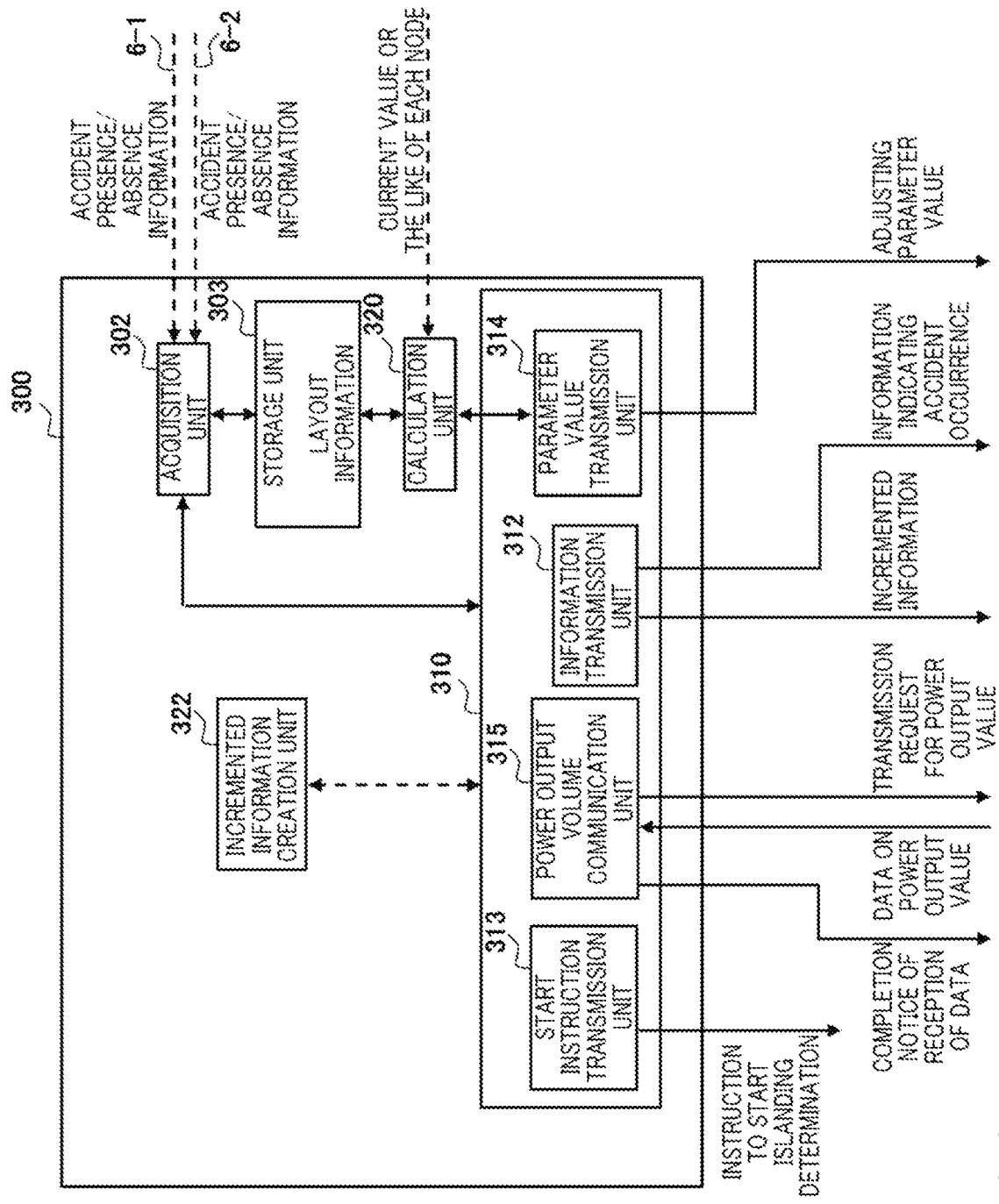
FIG. 15 shows a variation of the management server 300.

FIG. 15 shows a variation of the management server 300. The management server 300 may include a communication unit 310, a calculation unit 320, and an incremented information creation unit 322. With the exception that the communication unit 310 may include a parameter value transmission unit 314 and a power output volume communication unit 315 in addition to an information transmission unit 312 and a start instruction transmission unit 313, the configuration of the management server 300 of the present variation is similar to that of the management server 300 shown in FIG. 13.

Figure 16:
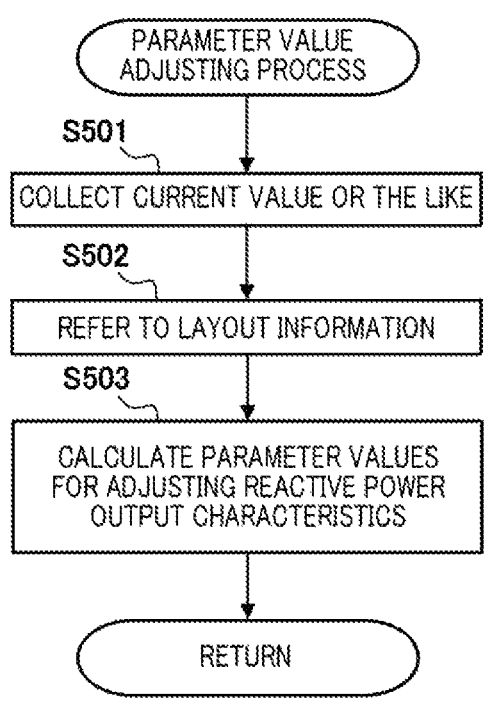
FIG. 16 is a flowchart showing an example of a parameter value adjustment process performed by the management server 300.

FIG. 16 is a flowchart showing an example of a parameter value adjustment process performed by the management server 300. The calculation unit 320 collects current values in a plurality of predetermined nodes in the power system 2 (step S501). The calculation unit 320 may acquire the current value of each node from values that current sensors show. The calculation unit 320 may acquire the positional relationship between the nodes and respective power conversion devices 200 by referring to the layout information stored in the storage unit 303 (step S502).

The calculation unit 320 calculates parameter values for adjusting reactive power output characteristics shown in FIG. 3, based on current values at the nodes, and the locations of the nodes and respective power conversion devices 200 (step S503). The parameter values for adjusting reactive power output characteristics may be the slope indicating the proportion of the amount of change in reactive power to the amount of change in frequency deviation in a region where the absolute value of the frequency deviation is from a to b, as shown in FIG. 3, or may be the maximum value (max), which is the value of reactive power when the frequency deviation is +b, or may be the minimum value (min), which is the value of reactive power when the frequency deviation is −b.

To be specific, the wiring impedance to the power conversion device 200 can be calculated from the current value at a node and the positional relationship, and as the wiring impedance increases, the slope indicating the proportion of the amount of change in reactive power to the amount of change in the frequency deviation in the reactive power output characteristics shown in FIG. 3 can become smaller. As the wiring impedance increases, the absolute value of the maximum value (max) and the absolute value of the minimum value (min) in the reactive power output characteristics shown in FIG. 3 can become smaller.

In this manner, the generation of voltage flicker can be suppressed during the islanding determination process. Such parameter values may vary with time. The parameter value transmission unit 314 transmits, to the plurality of power conversion devices 200-1, 200-2, and 200-3, parameter values for adjusting reactive power output characteristics which are used by the power conversion device 200 to perform the islanding determination process. Signals to transmit the parameter values may also be used as the transmission signal indicating no occurrence of accidents.

In FIG. 15, the power output volume communication unit 315 transmits, to the plurality of power conversion devices 200-1, 200-2, and 200-3, a transmission request for the management server 300 to transmit data on the power output value of the distributed energy resource 10. The power output volume communication unit 315 receives data on the power output value of the distributed energy resource 10 from the plurality of power conversion devices 200-1, 200-2, and 200-3. The power output volume communication unit 315 may transmit, to the plurality of power conversion devices 200-1, 200-2, and 200-3, a completion notice of reception of data on the power output value. When no accident occurred in the power system 2, the transmission request for the management server 300 to transmit data on the power output value of the distributed energy resource 10 or the completion notice of reception of data on the power output value may also be used as the transmission signal indicating no occurrence of accidents.

The transmission information may include information in which values are incremented sequentially. The incremented information may be created by the incremented information creation unit 322. The incremented information may include a time stamp. The time stamp proves that the electronic data existed at a particular time, and that the electronic data has not been altered since then. The time stamp may be added to the transmission request for data on the power output value, the completion notice of reception of data on the power output value, or the information on parameters for adjusting reactive power output characteristics, to be used as the transmission information.

In this way, a signal including information of at least one of a transmission request for data on the power output value, a completion notice of reception of data on the power output value, a time stamp (incremented information), and parameters for adjusting reactive power output characteristics may also be used as the reception signal indicating no occurrence of accidents.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A power conversion device comprising a processor and computer readable instructions which when executed by the processor perform a method which converts electrical power generated by a distributed energy resource into electrical power corresponding to a power system, comprising:
communicating, by control of the processor, periodically received reception information indicating whether an accident has occurred in the power system;
disconnecting, by control of the processor, the distributed energy resource from the power system when the reception information is received indicating an occurrence of the accident; and
starting, by control of the processor, an islanding determination process for determining whether the distributed energy resource is in an islanding state by detecting a change in AC characteristics in the power system, when the reception information does not indicate the occurrence of the accident for a predetermined first period; and
receiving, from a server, a parameter for adjusting a reactive power output characteristic of the distributed energy resource; wherein
the islanding determination process is performed using the parameter for adjusting the reactive power output characteristic received from the server.

2. The power conversion device according to claim 1, wherein
the islanding determination process determines whether the distributed energy resource is in an islanding state by detecting a change in the AC characteristics in the power system when reactive power is injected into the power system.

3. The power conversion device according to claim 1, wherein
the distributed energy resource is disconnected from the power system also when the distributed energy resource is determined to be in an islanding state by the islanding determination process.

4. The power conversion device according to claim 1, wherein
the islanding determination process is also started when an instruction is received by the distributed energy resource from the server to start the islanding determination process.

5. The power conversion device according to claim 1, wherein
when no accident occurred in the power system, the reception information includes a transmission request for transmitting, to the server, data on a power output value of the distributed energy resource, or a completion notice of reception of data on a power output value.

6. The power conversion device according to claim 1, wherein
when the reception information is not received from the server for a predetermined second period, the reception information is received from at least one other device that is different from the server.

7. The power conversion device according to claim 6, wherein
the at least one other device is an aggregator device which is communicatively connected to the server and the power conversion device, and which manages demand and supply of electrical power, and
the power conversion device further comprises transmitting, by control of the processor to the aggregator device, an instruction to acquire the reception information from the server and to transmit the reception information, when the reception information is not received from the server for the predetermined second period.

8. The power conversion device according to claim 6, wherein
the at least one other device is a plurality of accident detection units installed at a plurality of predetermined locations in the power system, and each of the plurality of accident detection units is mutually communicatively connected to the power conversion device via a communication line, and
the power conversion device further comprises transmitting, by control of the processor to the plurality of the accident detection units, an instruction to transmit the reception information, when the reception information is not received from the server for the predetermined second period.

9. The power conversion device according to claim 1, wherein
the power conversion device is communicatively connected to a plurality of accident detection units installed at a plurality of predetermined locations in the power system via at least one communication line, and
the power conversion device receives the reception information from each of the plurality of accident detection units.

10. A control device comprising a processor and computer readable instructions which when executed by the processor controls a power conversion device which converts electrical power generated by a distributed energy resource into electrical power corresponding to a power system, comprising:
communicating, by control of the processor, periodically received reception information indicating whether an accident has occurred in the power system;
disconnecting, by control of the processor the distributed energy resource from the power system when the reception information is received indicating an occurrence of the accident; and
starting, by control of the processor an islanding determination process for determining whether the distributed energy resource is in an islanding state by detecting a change in AC characteristics in the power system, when the reception information does not indicate the occurrence of the accident for a predetermined first period; and
receiving, from a server, a parameter for adjusting a reactive power output characteristic of the distributed energy resource; wherein
the islanding determination process is performed using the parameter for adjusting the reactive power output characteristic of the distributed energy resource received from the server.

11. A server comprising a processor and computer readable instructions which when executed by the processor perform a method which is capable of mutually communicating with a plurality of power conversion devices which convert electrical power generated by respective distributed energy resources into electrical power corresponding to a power system, comprising:
acquiring, by control of the processor, via a communication line, reception information on whether an accident has occurred in the power system from a plurality of accident detectors installed at a plurality of predetermined locations in the power system;

periodically transmitting, by control of the processor when no accident occurred in the power system, transmission information indicating no occurrence of accidents;

when it is determined that an accident has occurred in the power system based on the acquired information, in order to disconnect, from the power system, one or more distributed energy resources associated with the location where the accident has occurred in the power system, transmitting transmission information indicating accident occurrence to a power conversion device corresponding to the one or more distributed energy resources; and transmitting, to the one or more distributed energy resources, a parameter for adjusting a reactive power output characteristic of the one or more distributed energy resources; wherein an islanding determination process is caused to be performed by the one or more distributed energy resources using the transmitted parameter for adjusting the reactive power output characteristic.

12. The server according to claim 11, wherein
the transmission information indicating an occurrence of an accident in the power system includes location information of where the accident occurred.

13. The server according to claim 11, further comprising
transmitting a start instruction which, when the acquiring cannot acquire the information on whether an accident has occurred from one or more accident detectors, among a plurality of accident detectors, for a predetermined period, transmits, to the one or more power conversion devices associated with an installed location of the one or more accident detectors in the power system, an instruction to start an islanding determination process, which determines whether a distributed energy resource is in an islanding state by detecting a change in AC characteristics in the power system.

14. The server according to claim 13, wherein
the parameter for adjusting the reactive power output characteristics, based on a current value at a predetermined node in the power system, and locations of the node and each of the one or more power conversion devices.

15. The server according to claim 11, wherein
when no accident occurred in the power system, the transmission information includes a transmission request for transmitting, to the server, data on the power output value of the distributed energy resource, or a completion notice of reception of data on the power output value.

16. The server according to claim 11, wherein
when no accident occurred in the power system, the transmission information includes information in which values are incremented sequentially.

17. A system comprising:
a power conversion device comprising a processor and computer readable instructions which when executed by the processor perform a method which converts electrical power generated by a distributed energy resource into electrical power corresponding to a power system, the power conversion device comprising:
  communicating, by control of the processor, periodically received reception information indicating whether an accident has occurred in the power system;
  disconnecting, by control of the processor the distributed energy resource from the power system when the reception information is received indicating an occurrence of the accident; and
a server which is capable of mutually communicating with a plurality of power conversion devices which convert electrical power generated by respective distributed energy resources into electrical power corresponding to a power system, the server comprising a processor and computer readable instructions which when executed by the processor perform a method comprising:
  acquiring, via a communication line, information on whether the accident has occurred in the power system from a plurality of accident detection units installed at a plurality of predetermined locations in the power system; and
  periodically transmitting information, based on the acquired information, indicating no occurrence of the accident when no accident has occurred in the power system, and when it is determined that the accident has occurred in the power system, in order to disconnect, from the power system, one or more distributed energy resources associated with the location where the accident has occurred in the power system, transmitting information indicating the accident has occurred to a power conversion device corresponding to the one or more distributed energy resources, wherein
the transmission information from the server is received at the power conversion device as the reception information.

* * * * *